Nov. 30, 1937.  W. F. WHITEHEAD  2,100,499
HARROW
Filed Nov. 5, 1936  2 Sheets-Sheet 1
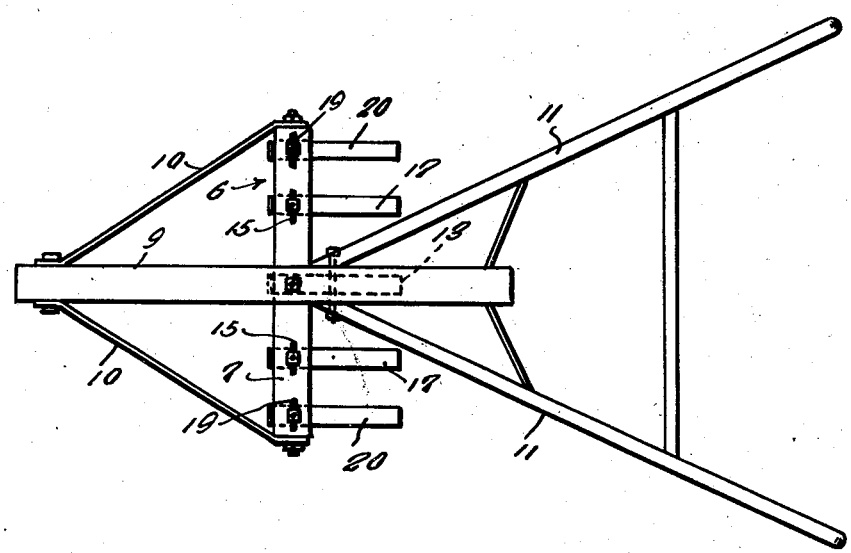
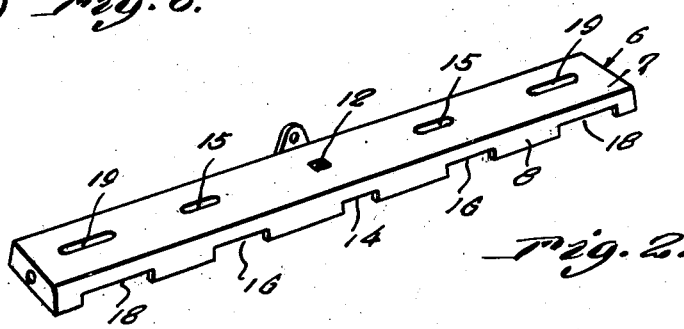
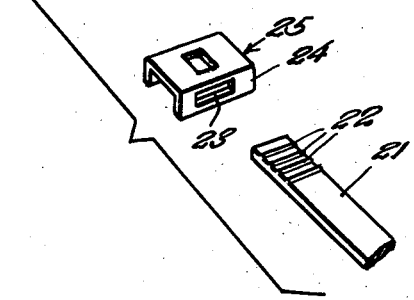
Inventor
W. F. Whitehead
By Clarence A. O'Brien
Hyman Berman
Attorneys

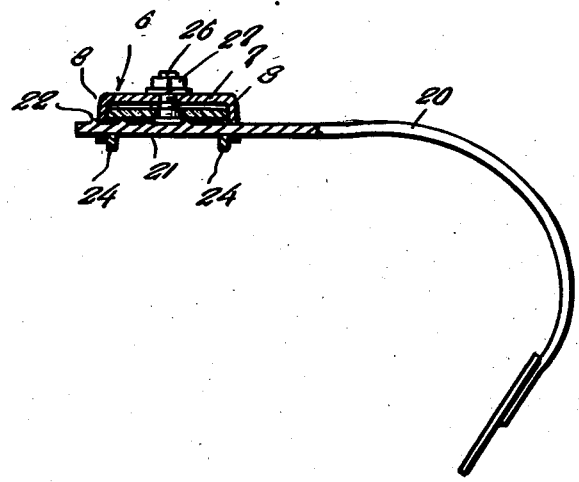
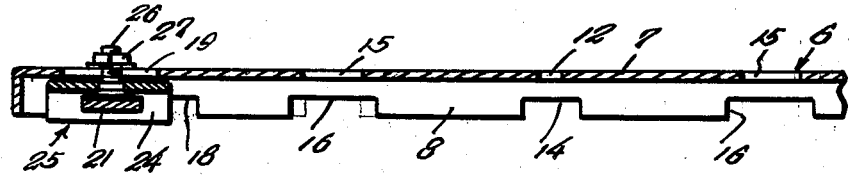
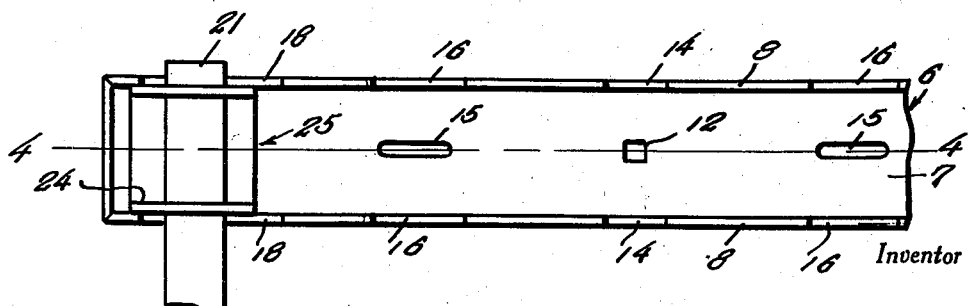

Patented Nov. 30, 1937

2,100,499

UNITED STATES PATENT OFFICE 2,100,499

HARROW

William F. Whitehead, Bassfield, Miss.

Application November 5, 1936, Serial No. 109,352

4 Claims. (Cl. 55—127)

This invention relates to farming implements in general and has particular reference to a strikingly and structurally new arrangement wherein the essence of the invention is devoted to the adoption and use of adjustable teeth and dependable supporting and retention means therefor.

Needless to say, I am sufficiently conversant with the prior state of the art to realize that adjustable harrow teeth are not broadly new. It follows, therefore, that the present inventive conception has to do with the special adaptation of a substantially channel-shaped frame member expressly designed to accommodate novel adjustable adapter clips with which the shank portions of the teeth are adjustably and releasably associated.

In reducing to practice the inventive ideas, I have evolved and produced what may be conveniently designated as a multiple purpose structure usable as a regular cultivator as well as a side harrow, thus providing what may be called a combination cultivator and harrow.

One feature of the invention resides in the adoption and use of a five-tooth assembly which functions in a practicable and ideal manner, to side harrow young crops. By the same token, the companion feature of the invention is derived from the adjustability of the teeth in this so-called side harrow so that it may then be used for properly harrowing and cultivating crops after they have matured to a predetermined above-the-ground growth.

Stated along more specific lines, the preferred embodiment of the invention embodies a relatively fixed frame or supporting member channel-shaped in cross sectional form and having its web portion apertured and its flanges notched to accommodate the complemental earth conditioning teeth, the arrangement being further preferred in that it includes special adapter clips to satisfactorily accommodate the shank portion of the teeth and to promote requisite strength and stability for comparatively heavy duty work.

Other features and advantages will become more readily apparent from the following description and drawings.

In the accompanying drawings, wherein like numerals are employed to designate like parts throughout the views:—

Figure 1 is a top plan view of the combined farm implement as constructed in accordance with the principles of the present inventive conception.

Fig. 2 is a perspective assembly view showing the essential details as perfected in accordance with my ideas.

Fig. 3 is a transverse sectional view detailing the adjustable adapter and retention means.

Fig. 4 is a fragmentary longitudinal section which may be said to be on the plane of the line 4—4 of Fig. 5.

Fig. 5 is a bottom plan view of Fig. 4.

Fig. 6 is a detail view of one of the non-turnable clip fastening and adjusting bolts.

Reference is had first to Fig. 1, wherein it will be observed that the major part of the invention comprises the relatively stationary frame unit or member 6. This is of longitudinally elongated form and may be described as channel-shaped in cross sectional form. It includes a substantially flat web portion 7 and depending spaced parallel drop flanges 8. The beam 9 extends centrally across the intermediate portion of the unit 6 at right angles thereto being suitably secured in place, properly braced as indicated at 10, and having attached to the rear end portion thereof, the customary handles 11 for the walking attendant.

Referring in greater detail to Fig. 2, it will be observed that the center of the web portion 7 is provided with a substantially rectangular opening or aperture 12 to accommodate the fastening means for the central tooth 13 and the superimposed beam held in place by the associated bolt and nut connection. At the same point, and in opposed flanges, I provide relatively narrow keeper notches 14 for the shank portion of said central tooth. On opposite sides of the bolt hole 12 are proportionately elongated aligned slots 15 having associated therewith correspondingly proportioned flange keeper notches 16. These slots and notches serve to accommodate the intermediate pair of teeth 17. The remaining outer pairs of notches 18 in the same flanges coordinate with the associated somewhat elongated slots 19 in accommodating the two outermost harrow or cultivator teeth 20. Thus there are five teeth in this assembly including the central tooth 13, the intermediate teeth 17, and the two outer ones 20. Moreover, the features 12 and 14, may be distinguished from the features 15 and 16, and the latter features differentiated from the features 19 and 18 to accommodate the distinguishably adjustable teeth.

Each tooth irrespective of its position in the gang, includes a shank portion 21 of standard dimensions. Thus the teeth are interchangeable but have different ranges of adjustment depending on the keeper notches with which they are associated.

Each shank is provided with transverse ribs 22 which constitute retention teeth. The toothed portions of the shanks extend through accommodation slots 23 in the depending flanges 24 of the relatively small adapter clips 25. These adapter clips are known as U-clips. Each shank has its own clip and each clip is connected with the proper slot by way of the non-rotatable bolt 26 and retaining or clamping nut 27 as depicted to advantage in Figs. 3 and 4.

By locating the adapter and shank in place as shown in the latter figures, it is evident that upon tightening the nut, this binds the clip in between the flanges of the mounting or frame member 6. At the same time, it binds the portions of the shank tightly up in the keeper notches to obtain the requisite clamping action. It will be noted that the anti-slipping teeth 22 also aid in maintaining this reliable clamped association of parts.

The central tooth 13 is substantially limited and is detachable but not adjustable. The two teeth 17 on opposite sides thereof are adjustable toward and from each other as well as toward and from the central tooth 13. The range of adjustment of these is proportionately limited with respect to the more completely adjustable outer teeth 20. The adjustment referred to here is the adjustment of the teeth at right angles to the longitudinal dimension of the part 6. Of course the teeth are adjustable individually in the adapter clip 25. The main adjustment, however, is when the adapter teeth and clips as a unit are adjusted bodily in the keeper notches 16 and 18, as the case may be.

It is evident that this combined harrow and cultivator has what may be described as minimum and maximum distance adjustment between teeth. These two distances are two and one-quarter inches on the one hand, and three and one-quarter inches on the other, and the structure is so arranged that it is possible to obtain any other distance between the maximum and minimum placements. From experience, I have found that it is necessary to have the distance between teeth of a spring tooth harrow at approximately two and one-quarter inches for side harrowing young plants. On the other hand, for cultivating and harrowing loose beds, especially after the plants have attained a predetermined growth, the proper distance between teeth is three and one-quarter inches. Thus, it follows that the special notched and slotted bolt arrangement depicted in the drawings enables this desirable result to be satisfactorily attained.

It is thought that persons skilled in the art to which this invention relates, will be able to obtain a clear understanding of the invention after considering the description in connection with the drawings. Therefore, a more lengthly description is regarded as unnecessary.

Minor changes in shape, size and rearrangement of details coming within the field of invention claimed, may be resorted to in actual practice, if desired.

Having thus described the invention, what is claimed is:—

1. In a combined harrow and cultivator construction of the class described, a frame including a relatively stationary unit, said unit being of longitudinally elongated form and channel-shaped in cross-section, the web portion of said unit being provided with a plurality of longitudinally spaced slots, the flanges thereof being formed with a plurality of pairs of longitudinally spaced notches, the respective pairs of notches being aligned with adjacent slots in a manner to dispose each pair of notches in substantial registry with each complemental slot, and a plurality of spring teeth, the shank portions of said teeth being adjustably and detachably connected with the slots and complemental pairs of notches in the manner and for the purposes described.

2. As a component part of an assemblage of the class described, a spring tooth mounting for use in a frame assembly comprising a longitudinally elongated member channel-shaped in cross sectional form, the web portion thereof having a restricted bolt hole at its center, being provided on opposite sides of said central bolt hole with a pair of aligned slots, being further provided in said web portion outwardly of said slots with an additional pair of slots of a length greater than the first-named slots, the depending flange portions of said member being provided at their centers with relatively narrow keeper notches aligned with said central bolt hole, the flanges being further provided outwardly of said central keeper notches with pairs of additional somewhat longer keeper notches associated with the said first-named slots, and said flanges being further provided adjacent their opposite outer ends with additional pairs of keeper notches aligned with the second-named slots and said outer keeper notches being of a length greater than the intermediate or second-named keeper notches.

3. In a structure of the class described, a frame member channel-shaped in cross sectional form and including a longitudinally elongated slot in its web portion, and keeper notches in its flanged portions aligned for cooperation with said slot, a substantially U-shaped adapter clip slidably mounted between the flange portions, the flanges of said clip being provided with aligned slots, a spring tooth including a shank portion provided with anti-slipping teeth, said shank portion extending through the apertures in the flanges of said clip, said shank portion being further located in said keeper notches, and a bolt carried by the web portion of the clip and adjustably connectable with said slot, whereby to provide the desired detachable adjustable mounting for the shank portion of said tooth.

4. A combination cultivator and harrow of the class described comprising a frame including a tooth supporting unit, said unit being provided with a plurality of bolt accommodation slots and associated keeper notches, five spring teeth having their shank portions cooperable with said slots and notches, the central tooth being relatively fixed, the intermediate teeth on opposite sides of said central tooth being adjustable toward and from the central tooth, and the remaining outer teeth being adjustable independently toward and from the intermediate teeth, the range of adjustment of the outer teeth being greater than the range of adjustment of the intermediate teeth in the manner and for the purposes described.

WILLIAM F. WHITEHEAD.